Sept. 3, 1957     R. H. FOLLIS ET AL     2,804,718
TOY ANIMAL BANK
Filed May 9, 1955     3 Sheets-Sheet 1
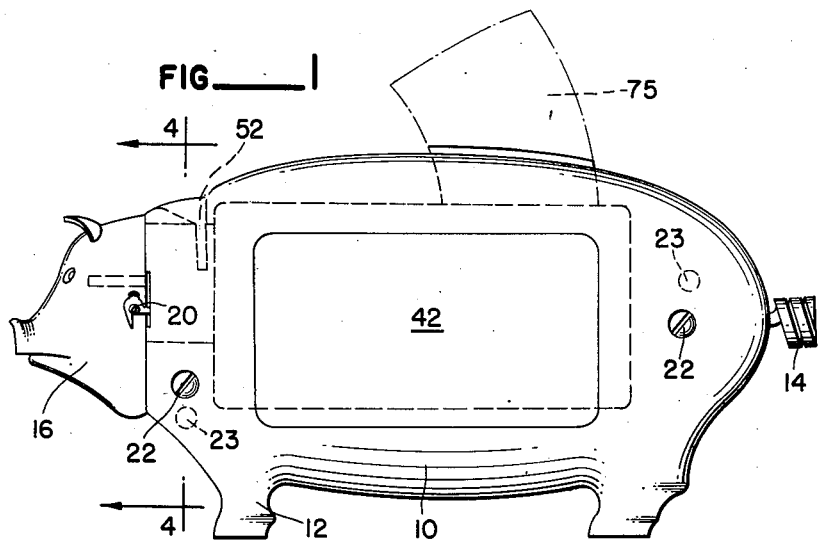
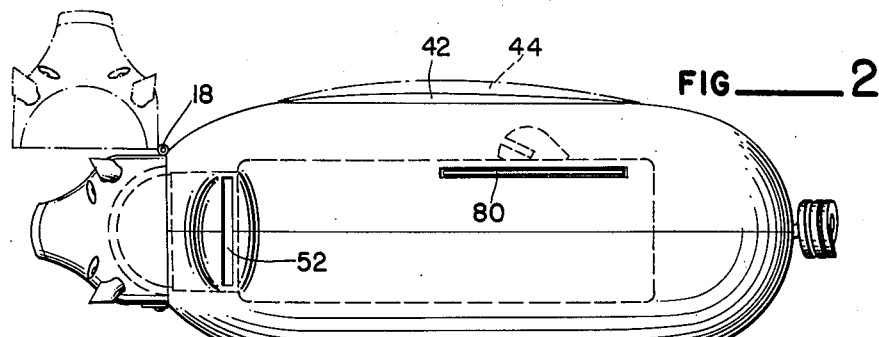
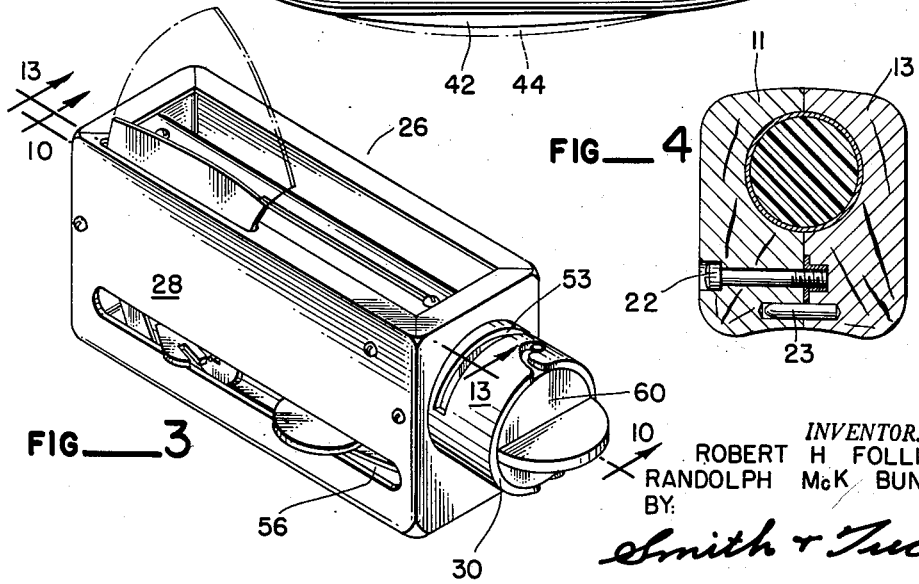
INVENTOR.
ROBERT H FOLLIS
RANDOLPH McK BUNDY
BY: *Smith + Tuck*

Sept. 3, 1957 R. H. FOLLIS ET AL 2,804,718
TOY ANIMAL BANK
Filed May 9, 1955 3 Sheets-Sheet 2
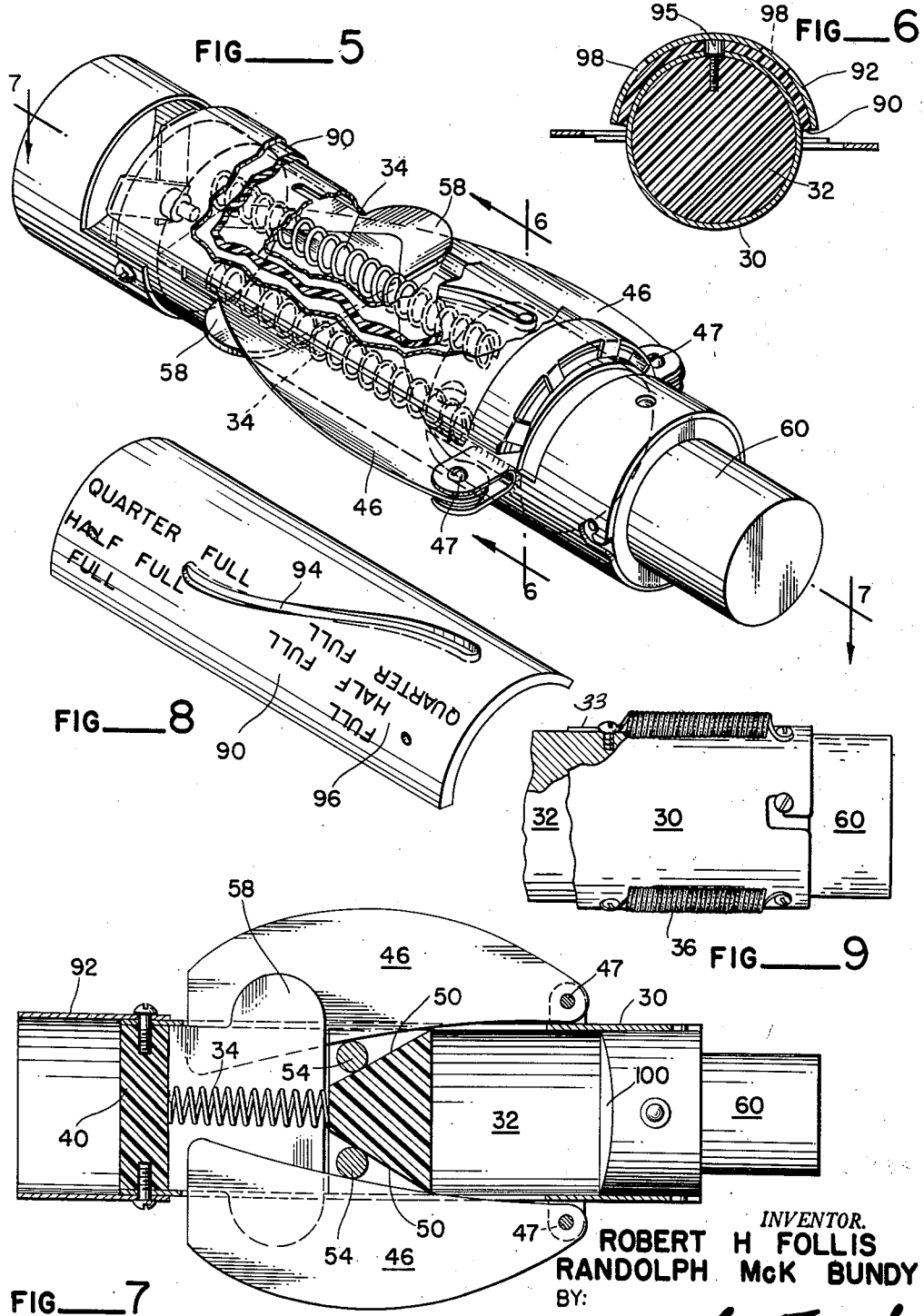
INVENTOR.
ROBERT H FOLLIS
RANDOLPH McK BUNDY
BY:
Smith & Tuck

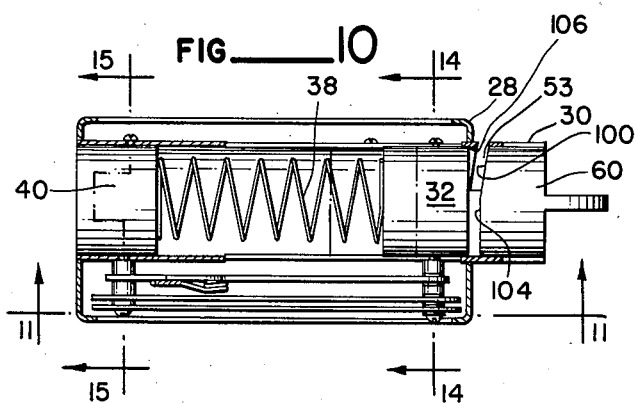
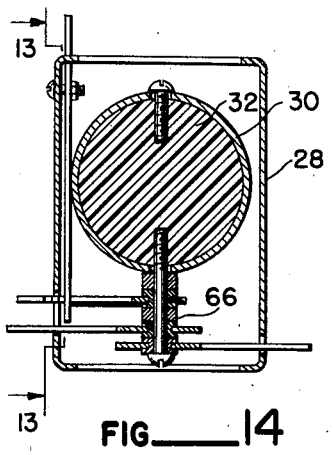
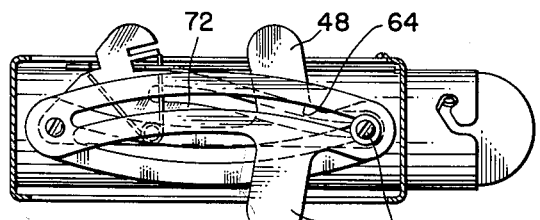
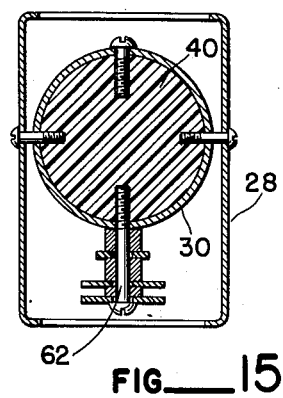
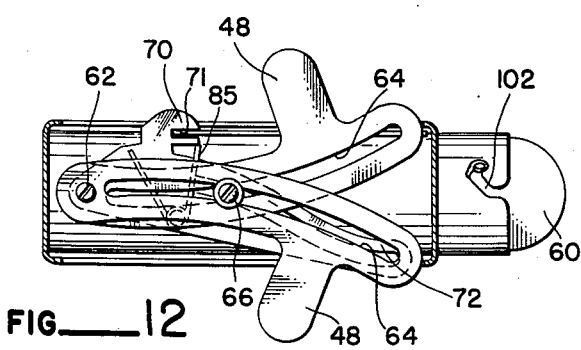
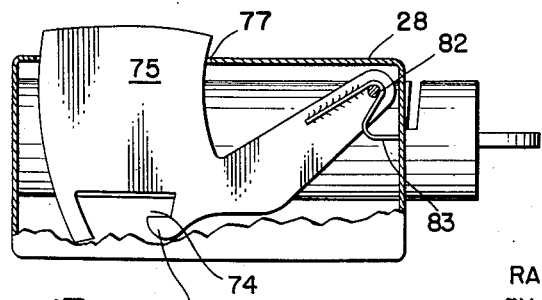

United States Patent Office 2,804,718
Patented Sept. 3, 1957

2,804,718

TOY ANIMAL BANK

Robert H. Follis, Monroe, and Randolph McK. Bundy, Seattle, Wash.

Application May 9, 1955, Serial No. 506,774

6 Claims. (Cl. 46—3)

This present invention relates to the general art of small coin banks, and more particularly to a bank made to represent an animal, such as a pig. The invention further contemplates the employment of internal mechanism within the bank which will progressively extend rigid members as coins are deposited in the bank, and these rigid extending members will engage and push outwardly on the expansible flank portions of the animal in order to show generally the increasing number of coins deposited in the bank. Means are further provided to display a visible signal when the bank is substantially full of coins.

A small coin bank in which coins are passed through a slot has been found to be one of the greatest means for encouraging thrift and saving habits, especially in children, and as a result many types of portable coin banks have been provided in the past. In this present bank mechanical means have been employed to give added incentive to saving habits and to give a child a visual indication of the general amount of coins deposited by a "fatten-up" of the animal-shaped bank. This general result is achieved by having the flank portions of the animal made of resilient extensible material. Experience has indicated that merely depositing coins through a slot into what might be a flexible-sided animal figure is not a satisfactory solution to the problem. Coins are disc-like and do not readily flow as would spheres, for instance. As a result no visual indication would be made of the depository of coins until the bank was actually filled, and this would reduce the incentive appeal of saving habits. In this present invention means have been provided to have the depositing of each coin move an internal mechanism a uniform amount for each coin deposited, and this mechanism in turn causes a distention of the flexible sides of the animal bank. In this manner each deposit made in the bank is immediately recorded in an increased distention of the animal's sides. It is therefore believed that this present bank combines the well-known virtues of the average animal-like bank with an indicating means which will show quite definitely the increasing deposits and in this manner increase the incentive or desire of the child to deposit more coins. Means are also provided to display a visual signal when the bank has been filled to its capacity.

The principal object of this present invention, therefore, is to provide a bank in the likeness of an animal having extensible sides so that continuing depositing or feeding of coins into the bank will "fatten up" the animal in a manner that is visible to the depositor.

A further object of this present invention is to provide an interior mechanism for an animal-like bank which will accept coins for deposit, and through the mechanical means provided, the sides of the animal will be distended to a degree by each coin deposited.

A further object of this present invention is to provide an animal-like bank having an enclosed coin receiving mechanism which can be easily removed from the bank when the bank is full or when repairs or adjustments are required of the coin receiving mechanism.

A further object of this invention is to provide an animal-like bank which will have a mechanical coin receiving mechanism so arranged that each coin will operate an indicating means showing the degree of coin accumulation, and with means further provided which make it impossible to extract any coins from the bank without disassembling the same.

A further object of this invention is to provide a mechanical mechanism for an animal-like bank which will show the depositing of each coin as made, and which will further indicate when the bank is full by the operation of a visual signal.

Further objects, advantages and capabilities will be apparent from the description and disclosure in the drawings, or may be comprehended or are inherent in the device.

In the drawings:

Figure 1 is a side elevation of a bank made after the teachings of this present invention;

Figure 2 is a top plan view of the bank of Figure 1 with the head portion of the same additionally shown revolved to its opening position and indicated in dashed lines;

Figure 3 is a perspective view illustrating generally the interior mechanism of our bank;

Figure 4 is a cross-sectional view taken along the line 4—4 of Figure 1;

Figure 5 is a perspective view illustrating the working parts of the interior core of the bank with certain parts broken away and sectioned to better illustrate the structure;

Figure 6 is a cross-sectional view taken along the line 6—6 of Figure 5;

Figure 7 is a longitudinal sectional view taken along the line 7—7 of Figure 5;

Figure 8 is a perspective view illustrating a cover member which may be used with our bank to provide one form of visual signal indicating that the bank has been filled or the degree to which it has been filled;

Figure 9 is a fragmentary view illustrating an alternate method of providing the actuating springs for our bank;

Figure 10 is a longitudinal sectional view through the mechanism of our bank along the line 10—10 of Figure 3;

Figure 11 is a longitudinal sectional view taken through the bottom portion of the mechanical coin handling means and substantially along the line 11—11 of Figure 10;

Figure 12 is a view similar to Figure 11, but showing the mechanism in a different operational position;

Figure 13 is a vertical side elevation, partly in section, as taken along the lines 13—13 of Figures 3 or 14;

Figure 14 is a cross-sectional view taken along the line 14—14 of Figure 10; and Figure 15 is a cross-sectional view taken along the line 15—15 of Figure 10.

Referring more particularly to the disclosure in the drawings, we have shown, as an example, our bank mechanism associated with a pig-like body, however, it should be expressly understood that our mechanism may be readily applied to any appropriate representation of animals, inanimate objects or nature's products. The numeral 10 designates generally the body of a desirable form of our bank. This is preferably made in the form of a well-fed pig, and may be made of any suitable material, such as wood or cast or ceramic materials. The body is provided with the usual feet, as 12, a twisted tail, as 14, and a head portion 16. Head 16 is hingedly secured to the body as by hinge 18, and in its operating position is provided with some form of securing latch, as the hook and pin arrangement indicated at 20. In many instances it is desirable to have either a key operated latch or some form of combination latch so that children cannot easily open the same. The exact form of latch will preferably be based upon the manner in which the bank is to be distributed and used. In its present form, as illustrated in Figures 1, 2 and 4, the body is formed of two pieces of wood, as 11 and 13, which are secured together by a plurality of screws or bolts 22, and in order to assure alignment of the parts, dowel pins, as 23, are provided.

Adapted to be secured within body 10 is the coin handling and indicating mechanism 26, such as is illustrated in Figure 3. This assembly consists essentially of preferably a sheet metal housing portion 28, which provides positioning and guide means for the operating mechanism and also permits the easy installation as a unit within the body 10 of the bank. Within housing 28 is provided, preferably, a tubular metal cylinder 30 within which, or secured to it, are the principal working parts of the coin handling and indicating means. Disposed for reciprocation within tube 30 is the follower unit 32. This unit is normally spring urged to the right, as viewed in the various views by some appropriate spring means. The exact construction of the various parts of the bank will, of necessity, have to be varied in accordance with the price range the bank is to serve, and the design will further be influenced by the materials used, especially in the body 10 of the bank. To illustrate the variety of construction at this point, it is to be noted that in Figures 5 and 7 a plurality of compression springs 34 are employed. In Figure 9 exteriorly mounted tension springs 36 may be employed. In the simplest form of the device a single compression spring, as illustrated in Figure 10 at 38, may be satisfactorily employed. Where compression springs are employed, it is desirable to employ an abutment block made preferably of plastic or wooden materials and indicated at 40. Such an abutment is preferably screw fastened to the tubular housing member 30.

In order to carry out the analogy of the "fatten-up" of the bank, we have provided that each of the flank portions, one on each side of the body 10, will be formed of resilient material, indicated at 42. A preferred material for this portion is sheet rubber of reasonable thickness, comparable to the thickness of a thin walled rubber ball. It is desirable, on one hand, that the flank portion will expand as additional coins are put in the bank, but it is further desirable that they will expand rather uniformly throughout the extent of the flank, as is illustrated by the dashed lines at 44 in Figure 2. It is further desirable that the mechanical means that causes this outward extension of the flank portions will not merely bulge the flanks at one portion, but have the effect of swelling the sides out as a whole. Mechanical means to engage and distend the flank portions are illustrated in the pivoted arms, as 46 in Figure 7, or the modified form of arms, indicated at 48 in Figures 11 and 12.

Referring to Figure 7 and Figure 5, the arms 46 which cause the distention of the flanks 42 are pivoted, as at 47, on two lugs which are secured to the tubular housing 30. These arms are normally urged inwardly by the resilient character of flanks 42 and are forced outwardly by the cam surfaces provided at 50 as a part of follower 32. These cam surfaces are so positioned that member 32 is moved to the left, as viewed in Figure 7, by the successive introduction of coins through the feeding slot 52 in body 10 and the associated slot 53 in the cylindrical housing member 30. To reduce friction to a minimum, rollers 54 are provided, operatively disposed between cam surfaces 50 and the inner margins of arm 46. Arms 46 are guided in part by oppositely disposed slots 56 in the mechanical housing 28, and, further, by the guide member 58, which, as will be noted in Figure 7, is disposed between the two pivoted members 46. In this manner any tendency for them to abut each other is eliminated when the arms are in their retracted position.

As an alternate arrangement to that illustrated in Figures 5 and 7, the form illustrated in Figures 10 through 15 is provided. Certain parts of this structure are also illustrated in Figures 2 and 3. In this form more intricately fashioned stamped parts are employed. These can be produced more cheaply if sufficiently large quantities can be disposed of to amortize the added cost of the production equipment. Housing 28 and the tubular housing or support member 30 remain the same, where a simpler spring arrangement indicated at 38 controls the positioning of the reciprocal block 32 and at all times holds it up against the removable closure plug 60 or against the coins that have been inserted through the feed slot 53. The flank extending arms 48 are pivotally secured at 62, which pivot is secured to tube 30 with the coaction of the abutment plug 40. Each of arms 48 is provided with an arcuate slot 64 running substantially throughout its length. Adapted for longitudinal movement within the two arcuate slots 64 is the movable pivot 66. The pin 66, which is the actuating pin for the outward positioning and movement of levers 48, is fixedly secured to the reciprocating follower member 32, and is carried with it during its longitudinal movement within the tubular housing 30 as coins are fed into the bank. It is believed that the function of these arms will be clear from a study of Figures 11 and 12. It is to be noted that the relative firmness of the flexible flank portions 42 is increasingly more desirable as the swing of the contact portions of members 48 is so great that the contact must be of limited length and thereby is quite a departure from the rather generous contact of the pivoted arms 46 of the alternate form.

Also adapted to be operated by pivot pins 66 is the visual signal restraining member 70. This member is pivoted at 62 and has the extended arm 72 so that the pawl member is rotated, as will be noted in the two views of Figures 11 and 12. Pawl 70 rides in a slotted seat 74 in the visual signal member 75. This member comes up through the slotted opening 77 in housing 28 and the slotted opening 80 in body 10. The flag member 75 is pivotally supported at 82 and is urged by spring 83 to the upper or exhibited position, and it is only when the bank is full that the rotation of pawl 70 is sufficient to release flag 75 and cause it to show that the bank is full, as viewed in Figure 1 in dashed line. The specific arresting means is spring 85 secured to pawl 70. This spring is deflected by the curved portion of lug 73 during the initial setting of flag 75 and is moved out of the path of the flag to release the same. The released flag passes through opening 71 in the pawl.

As an alternate to this signal means, reference is made to Figures 5, 6 and 8, in which it will be noted that a cover member 90 is provided which is arcuate in form to fit partially around the cylindrical assembly predicated upon the tubular housing 30. Disposed outwardly from cover 30 is an outer shield member 92. This shield member is preferably fixedly secured to the tubular housing 30, and has an arcuate portion that extends over the coin handling mechanism.

Cover 90 is provided with a cam slot 94 which is adapted to operatively engage a screw head 95, which screw is, in turn, fixedly secured to the movable plug member 32. With this general arrangement, as plug 32 is moved longitudinally of housing 30, it will revolve cover 90 due to the coaction between screw 95 and the cam slot 94. As cover 92 is revolved, the normal nomenclature, indicated at 96, may be read through the openings, as 98, occurring at each end of shield 92 and thereby providing a visual indication of the coins deposited in the bank.

In using our bank, the coins that are deposited in the bank are inserted through the coin slot which consists of the slot 52 in body 10 and slot 53 in the tubular housing 30. Reference is made to Figure 10 which probably best illustrates the preferred form of this slot. It will be noted that slot 53 is angularly disposed in the upper half of its vertical extent so that the coin presented to the bank enters at a small angle to the longitudinal axis of tube 30. This slope is provided by the sloping surface 100 which is the inside base of plug 60. Plug 60 is operatively positioned by detents provided on it which engage in the bayonet slot arrangement 102 formed in tube 30. The lower half of the plane formed by the inner end of plug 60 is disposed at right angles to the axis of tube 30, as will be noted at 104. This lower straight portion tends to straighten up the coin so that it, in turn, is at right angles to the axis of the tube, because the coin is held against surface 104 by the spring action tending to move the reciprocating plug 32 to the right, as viewed. The end result of this action is to cause the coin to move under the overhanging lip 106, formed as part of tube 30, and once the coin has been seated under this lip it is impossible to remove the same except by very special tools which would not normally be available. Each successive coin introduced into slot 53 first enters at an angle so that it tends to cam the coins previously deposited and plug 32 to the left, against the spring arrangement. Therefore, this upper sloping surface 100 acts as a very convenient guide means to insure the proper functioning in the bank at this stage of its operation. As plug 32 is moved to the left by each successive coin, it causes, through the means previously described, the outward movement of the levers which expand or distend the flexible materials forming the flank of the animal bank body. Secondly, during this bank coin feeding operation the indicator, made after the showing in Figure 8, will be gradually revolved so that an index is had as to the approximate amount or bulk of variously sized coins in the bank. If the form shown in Figures 11, 12 and 13 is employed, each successive coin progressively revolves the latch member or dog so that when the bank is full the flag member 75 will be released and under urgence of its operating spring 83 it will rise to the upper position to give the desired indication.

It is believed that it will be clearly apparent from the above description and the disclosure in the drawings that the invention comprehends a novel construction of an animal-shaped bank having expansible sides.

Having thus disclosed the invention, we claim:

1. A bank having the shape of an animal such as a pig or the like, comprising: a body having the contour of such animal and having a resilient wall in each side expansible from a normal inner position denoting lean flanks to an outer expanded position denoting stout flanks; said body formed of two halves joined on a longitudinally disposed vertical plane; a horizontally disposed tube extending axially of said body of a size to accommodate coins stacked face to face at right angles to the tube axis and a coin receiving opening in said body registering with one end of said tube which is slotted to receive coins deposited in the coin opening; a removable plug adapted to close the slotted end of said tube; an animal head hingedly secured to said body and disposed to cover said plug during normal use of the bank; a pair of pivoted lever arms having free ends disposed to outwardly press the resident walls, in a manner not apparent to the bank user, as the lever arms are pivoted; a traveler in said tube disposed to move between a position adjacent but inside of the tube coin slot to a position nearer the other end of said tube; spring means pressing said traveler toward a position adjacent said coin slot; and mechanical means between said traveler and said lever arms pivoting said lever arms outwardly as said traveler is urged to the other end of said tube by coins inserted in said coin slot.

2. The subject matter of claim 1 in which said mechanical means between said traveler and said arm includes wedge-shaped cam surfaces on said traveler and cam surfaces on said lever arms in their inner position converging in the direction of movement of said traveler away from said coin slot whereby said arms are moved by a wedging action to their outer position as the wedge-shaped cam surfaces are moved toward the cam surfaces on said lever arms by increments as coins are deposited in said tube.

3. The subject matter of claim 1 in which said mechanical means includes a longitudinally extending slot in each of said lever arms and a common pin on said traveler disposed in said slots and said slots having such contour as to spread said lever arms as said common pin moves therein in movement of said traveler away from said coin slots as coins are deposited in said tube.

4. The subject matter of claim 3 in which there is a visual signal when said bank is full provided by a pawl having an extended arm in the path of said common pin and spring pressed to ride thereagainst, a vertical flag plate pivotally mounted in said body to move between a lower position and an upper position in which a portion thereof is exposed above said body, the lower end of said plate being slotted and said pawl having a portion positioned in said slot normally tending to holding said plate in its lower position, said pawl portion having a slot at one point registering with said plate permitting said plate to escape upward and spring means pressing said plate toward its upper position, said point of registration occurring when said traveler has moved to a position at the other end of said tube from said coin slot by the action of coins deposited therein, thereby pivoting said pawl by the action of said common pin on said extended arm.

5. The subject matter of claim 1 in which there is a plate abutting the upper surface of said tube formed as a section of a cylinder and movable rotatably of said tube and said plate having a helical slot and said traveler having a pin positioned in said helical slot whereby as said traveler moves said pin in said helical slot said plate is shifted about the tube axis, and said body having an opening exposing a portion of said plate and said plate having various indicia registering with said opening as said plate is shifted to indicate the travel of the traveler in terms of the extent of tube capacity filled by coins.

6. The subject matter of claim 1 in which there is a removable plug at the outer end of said tube and on the opposite side of the coin slot from said traveler having an inner face with a portion oblique to normal to the axis of said tube extending from said coin slot, the oblique portion of the face being joined by a face portion extending at right angles to the axis of said tube whereby coins being inserted will be canted by said oblique face portion to wedge aside coins and then abutting said right angular portion, and the coin slot having an edge overhanging the position of coins against said right angular faced portion due to the offset by the oblique face portion whereby the coins will be positioned under the solid overhanging portion and can not be removed through said coin slot.

References Cited in the file of this patent

UNITED STATES PATENTS

| | | |
|---|---|---|
| 1,811,225 | Zerbee | June 23, 1931 |
| 2,448,807 | Kimball | Sept. 7, 1948 |